US010864703B2

(12) United States Patent
Millares-Neyra et al.

(10) Patent No.: US 10,864,703 B2
(45) Date of Patent: Dec. 15, 2020

(54) NON-TRANSPARENT ART PAPER WHICH PREVENTS SEEPAGE

(71) Applicants: Ricardo Millares-Neyra, Col. Industrial Vallejo (MX); Ricardo Millares-Sotres, Col. Industrial Vallejo (MX); Dalila Rivera-Carmona, Col. Industrial Vallejo (MX)

(72) Inventors: Ricardo Millares-Neyra, Col. Industrial Vallejo (MX); Ricardo Millares-Sotres, Col. Industrial Vallejo (MX); Dalila Rivera-Carmona, Col. Industrial Vallejo (MX)

(*) Notice: Subject to any disclaimer, the term of this patent is extended or adjusted under 35 U.S.C. 154(b) by 193 days.

(21) Appl. No.: 15/727,383

(22) Filed: Oct. 6, 2017

(65) Prior Publication Data

US 2018/0029330 A1 Feb. 1, 2018

Related U.S. Application Data

(63) Continuation of application No. 13/919,355, filed on Jun. 17, 2013, now abandoned.

(30) Foreign Application Priority Data

Jan. 10, 2013 (MX) .................... MX/a/2013/000399

(51) Int. Cl.
| | | |
|---|---|---|
| *B32B 7/12* | (2006.01) | |
| *B32B 29/00* | (2006.01) | |
| *B32B 29/06* | (2006.01) | |
| *D21H 27/30* | (2006.01) | |
| *D21H 17/36* | (2006.01) | |
| *D21H 17/67* | (2006.01) | |

(52) U.S. Cl.
CPC .............. *B32B 7/12* (2013.01); *B32B 29/005* (2013.01); *B32B 29/06* (2013.01); *D21H 17/36* (2013.01); *D21H 17/67* (2013.01); *D21H 27/30* (2013.01); *B32B 2255/12* (2013.01); *B32B 2255/26* (2013.01); *B32B 2255/28* (2013.01); *B32B 2260/028* (2013.01); *B32B 2260/046* (2013.01); *B32B 2307/406* (2013.01); *B32B 2307/41* (2013.01); *B32B 2307/726* (2013.01); *B32B 2307/728* (2013.01); *B32B 2307/7265* (2013.01); *B32B 2554/00* (2013.01); *Y10T 428/25* (2015.01); *Y10T 428/254* (2015.01); *Y10T 428/256* (2015.01); *Y10T 428/258* (2015.01); *Y10T 428/259* (2015.01); *Y10T 428/3179* (2015.04); *Y10T 428/31515* (2015.04); *Y10T 428/31663* (2015.04); *Y10T 428/31895* (2015.04); *Y10T 428/31899* (2015.04); *Y10T 428/31902* (2015.04); *Y10T 428/31993* (2015.04)

(58) Field of Classification Search
None
See application file for complete search history.

(56) References Cited

U.S. PATENT DOCUMENTS

| | | |
|---|---|---|
| 1,988,179 A | 7/1933 | Natwick |
| 4,028,173 A | 6/1977 | Olson |
| 4,731,291 A | 3/1988 | Kerkhoff et al. |
| 4,734,336 A | 3/1988 | Oliver et al. |
| 5,180,624 A | 1/1993 | Kojima et al. |
| 5,401,562 A | 3/1995 | Akao |
| 5,654,050 A | 8/1997 | Whalen-Shaw |
| 5,714,270 A | 2/1998 | Malhotra et al. |
| 6,103,308 A | 8/2000 | Floyd et al. |
| 6,224,660 B1 | 5/2001 | Stübbe et al. |
| 6,564,199 B1 | 5/2003 | Pruett et al. |
| 7,364,790 B2 | 4/2008 | Avazzeri et al. |
| 2004/0038056 A1* | 2/2004 | Song ................. B41M 5/52 428/500 |

(Continued)

FOREIGN PATENT DOCUMENTS

WO  WO 2011/027752  3/2011

OTHER PUBLICATIONS

Encyclopedia of Surface and Colloid Science, 2$^{nd}$ Ed., P. Somasundara, ed., Taylor and Francis Group, 2006, p. 4447.
Helpful Fact About Paper, Xerox, pp. 11, 49, Sep. 2004.
Triton X-100 Technical Data Sheet, Dow Chemical Company.

* cited by examiner

*Primary Examiner* — Scott R. Walshon
*Assistant Examiner* — Elaine M Vazquez
(74) *Attorney, Agent, or Firm* — Arnold & Porter Kaya Scholer

(57) ABSTRACT

A non-transparent paper is described for non-transparent art or graphic design sketches, which prevents seepage of the inks, it accepts any type of gel, water-based, solvent-based, oil-based or mixed inks and solid materials for sketching and drawing, as well as fixatives for the solid materials. This paper consists of a lamination of at least two sheets of uncoated bond paper, inserting at least one intermediate layer of pigmented opacifying emulsion between both sheets, applied between the layers of paper to prevent transparency and the seepage of inks from one face of the lamination to the other. This layer of emulsion contains at least one opacifying pigment, at least one adhesive, agents to control viscosity and surface tension and other components. The outside layers of paper have a drying capacity which fixes the materials used for the sketching and prevent outlines made on one face passing to the adjacent sheets of paper, and also has a texture suitable for receiving any dry material for drawing or sketching.

24 Claims, No Drawings

(56) References Cited

U.S. PATENT DOCUMENTS

| | | | |
|---|---|---|---|
| 2005/0037158 A1* | 2/2005 | Hong | B41M 5/5218 428/32.34 |
| 2005/0260428 A1 | 11/2005 | Song et al. | |
| 2011/0245369 A1 | 10/2011 | Lundgrad et al. | |
| 2012/0050440 A1 | 3/2012 | Nakano | |
| 2012/0208698 A1 | 8/2012 | Hayakawa et al. | |
| 2014/0193633 A1* | 7/2014 | Millares-Neyra | B32B 7/12 428/327 |

NON-TRANSPARENT ART PAPER WHICH PREVENTS SEEPAGE

RELATED APPLICATIONS

This application is a continuation of U.S. patent application Ser. No. 13/919,355, filed on Jun. 17, 2013, which claims priority to Mexican Patent Application No. MX/a/2013/000399, filed on Jan. 10, 2013, the contents of which are herein incorporated by reference in their entirety.

FIELD OF THE INVENTION

The present invention refers to paper for sketches, art tracing, and graphic design applications, such paper being manufactured based on a lamination of at least two sheets of bond paper with at least one layer of intermediate emulsion with pigments which are non-transparent and waterproof to the passing of the ink. The paper produced in this way is non-transparent and prevents the seepage of inks and liquid materials, favors the drying of the inks, averts the running of the inks and accepts without problem the application of dry materials for drawings and sketches.

BACKGROUND

A very extensive offering of different papers and other media for creating thereon sketches, drawings and other artistic expressions already exist in the state of the art. Although these papers are special for each use, they present deficiencies such as transparency, transmission of inks to other surfaces (bleeding), failure to dry, and/or failure to fix dry materials.

To make sketches, many artists and graphic designers prefer to use paper, in large sheets or, above all, in sheets of an easily-transportable size which can even be joined, fastened or bound in books, booklets or notebooks.

Artists and graphic designers utilize different drawing and painting materials which can be either liquid or solid. Special papers exist for some specific applications, such as the paper known as Guarro paper for watercolors and several degrees identified by the Canson brand and other commercial brands; however, these special papers are not suitable for a wide range of drawing or sketching materials. This hinders their use in mixed techniques in which a user combines more than one liquid or dry material.

The following patents are recorded in the state of the art:

U.S. Pat. No. 1,988,179, to A. G. Natwick et al., issued Jan. 5, 1935, refers to an opaque paper. This invention utilizes pigments with waxes, and has no connection with the present invention.

U.S. Pat. No. 4,028,173 to R. A. Olson, issued Jun. 7, 1977, describes a combination of titanium dioxide and calcium carbonate to form an opaque paper. This patent is specifically for a combined use of both pigments, and has no connection with the present invention.

U.S. Pat. No. 5,654,050 to M. Whalen-Shawn, issued Aug. 5, 1997, describes laminated cards printed on both sides and printed with designs.

U.S. Pat. No. 7,364,790 to L. Avanzzari et al., issued Apr. 29, 2008, describes a highly-opaque sheet of various layers and the production method which applies various layers to sheets of paper; a sheet with a grey-colored layer, and the second with a white exterior 10 g/m$^2$ coating.

The foregoing references are not related to the present invention.

In order to make sketches, several materials may be used, such as felt-tipped pens or markers; pens with water-based ink, solvent base ink, gel inks, Chinese ink, oil-based ink and other black and varied-colored inks; water colors; inks for other drawing, sketching and writing instruments; ball-point pens; and dry materials such as carbon, charcoal, pastel colors, chalks, carbon pencil, graphite of different hardness, colored pencils, materials with a wax-base and other dry materials.

In the current state of the art papers, several problems often arise including: inks seeping through to the other side of the paper; images being viewable on both sides of the paper because the paper is at least partially transparent due to its limited opacity; and apparently-dry inks staining adjacent materials. If coated papers such as Couche are used, their texture is often too fine and prevents drawing with dry materials such as charcoal, carbon, charcoal or graphite pencils, colored pencils, pastels and other materials commonly-applied in the field of graphic design and art, and additionally prevents fast drying of gel or oil-based or ballpoint inks, causing the sketch to bleed onto adjacent pages or run on touch. The paper known as Albanene tracing paper accepts inks and dry materials very well, but is highly transparent.

In order to achieve non-transparency, attempts have been made to utilize coated papers such as Couche and others. Although these coatings raise the opacity of the paper, they provide a very smooth texture and paper with sub-optimal absorbency. This often prevents inks from drying, and prevents drawing with pencils or other dry materials.

There are other papers on the market for sketching with felt-tipped pens or markers which limit the absorption of ink, but are not suitable for dry materials. Other papers are available which are more suitable for dry materials, but these papers are too absorbent for felt-tipped pens as they consume the ink excessively and this runs or bleeds through the paper.

BRIEF DESCRIPTION

A sketch paper is described for art and design applications, which allows the use of drawing, design or painting materials without fluid materials or inks seeping through to the other side of the paper. It possesses an optimal texture for drawing with solid materials. The paper is non-transparent, thus what is drawn on one side is not seen on the other side of the paper, allowing for the use of both sides of the paper. The present disclosure describes both the sketch paper itself and methods for creating it.

The sketch paper of the present invention is suitable for drawing sketches with felt-tipped pens or markers, as well as water or solvent-based ink pens, gel inks, Chinese ink, oil-based inks, ball point pens, other inks, without the ink seeping through to the other side of the paper. It also prevents the image from being visible from one side of the paper to the other, i.e. the sketch paper is not transparent. With these properties sketches may be made on both sides of each sheet. The sketch paper also facilitates drying of the ink due to its absorbent qualities. Due to its texture and surface finish it permits sketching with dry materials, including charcoal, pastel colors, chalks, graphite and colored pencils, materials with a wax base and other dry materials. The sketch paper according to the present disclosure also permits the application of commonly-used fixatives for some dry materials. It possesses the novel property that liquid or dry materials are dried or cured and not transferred to adjacent papers.

The opacity of the sketch paper according to the present disclosure, which makes it non-transparent, is generally between 88% and 99.5% TAPPI (Technical Association for the Pulp and Paper Industry) T-425 and, in certain embodiments, between 90% and 99.5% TAPPI T-425, and it has a minimum brightness of 90% TAPPI T-452.

The sketch paper according to the present disclosure may comprise at least two base sheets of bond paper, which may be laminated together. The sketch paper may further comprise at least one intermediate layer of an emulsion containing non-transparent pigments, creating a waterproof barrier against migration of the inks and their solvents or vehicles.

Description

A sketch paper according to the present disclosure may have a minimum brightness of 90 on the TAPPI scale of brightness; may be acid-free and sulfites free; may have a high virgin alpha-cellulose fiber content above or equivalent to 78%; may possess a Gurley Hill porosity of 20-10 Sec/100 cc air suitable for receiving all kinds of inks such as water-base, solvent-base, gel, oils, or having mixed diluents which may be applied with felt-tipped pens, markers, pens, paint brushes, brushes, stylographic pens or other sketching, writing, painting or drawing instruments, this porosity ensuring that these inks dry well without allowing the lines and figures made thereon to run or blur; which may have a suitable finish or texture to fully accept the application of dry drawing and art materials such as carbon, charcoal, pastel colors, chalks, carbon pencils, graphite of different hardness, colored pencils, materials based on waxes and other dry materials; and which may even accept renderings based on watercolor and gouache. A sketch paper according to the present disclosure may also accept fixatives for dry materials.

As a result, a sketch paper according to the present disclosure may achieve the unique result of allowing a suitable degree of ink absorption so as to provide fast and complete drying, preventing smears or running, while simultaneously providing a surface texture to which dry materials can be efficiently applied. This feature makes it novel as it facilitates the use of mixed techniques.

In a first embodiment according to the present disclosure, a sketch paper may comprise at least two base sheets of bond paper of the same type and same weight of 68 $g/m^2$, which are laminated together.

A sketch paper according to this embodiment of the present disclosure may further comprise at least one intermediate layer inserted between the two base sheets. In one embodiment, such intermediate layer may be an aqueous emulsion of opacifier components, such aqueous emulsion comprising: at least one chemical opacifier compound selected from among the pigments of carbon black, rutile titanium dioxide, anatase titanium dioxide, calcium carbonate, kaolin with laminar structure, calcined kaolin, white polymers, organic pigments, inorganic pigments; one or more adhesives; at least one styrene emulsion selected from among butadiene, acrylic emulsion, acetylated starch, oxidized starch and other compounds such as low viscosity highly hydrolyzed polyvinyl alcohols; and one or more viscosity and surface tension control agents to provide stability to the selected emulsion, such as acrylic polymers and non-ionic surfactants, selected from among the materials commercially known SURFYNOL ct-131, SURFYNOL ct-171 and SOLFIX 855, and TRITON X-100 (polyethylene glycol tert-octylphenyl ether, Chemical Abstracts Service No. 9002-93-1).

In this embodiment, the sketch paper may further comprise one or more additional intermediate layers inserted between the two base sheets, such additional intermediate layers comprising one or more additional emulsions.

The foregoing emulsion or emulsions may be applied by impregnating equipment, and their thicknesses may be calculated by the use of jets or sprinklers, bound rods, scrapers, air blades or any other suitable means used in the state of the art. It will be understood by one having ordinary skill in the art that reference is made to these methods only as a means to accomplish the methods according to the present disclosure and do not represent the invention itself.

Additionally, the sketch paper may comprise one or more synthetic and/or natural resins which may be placed on the inside of each base sheet, i.e., the face of each base sheet which is to be laminated to the other base sheet, to prevent ink bleeding and to preserve fine lines and sketches in larger areas. In certain embodiments, the sketch paper may further comprise one or more synthetic and/or natural resins placed on the outside face of each base sheet (to remain after lamination) to provide additional protection against ink bleeding and the blurring of fine lines, etc.

In a second embodiment according to the present disclosure, at least two sheets of greater weight may be used, such as 80 $g/m^2$, 90 $g/m^2$ and up to 100 $g/m^2$. In still other embodiments, sheets of even higher weights may be used.

In a third embodiment according to the present disclosure, the two base sheets may have different finishes or textures on the outside face to optimize their application for dry drawing materials, which may be achieved by covering the outside faces of one or both of the base sheets with one or more kaolins, adhesives or other additives.

In a fourth embodiment according to the present disclosure, the two base sheets may be impregnated, prior to lamination, with a cationic wet strength additive together with carboxylated polyvinyl alcohols to provide a protective barrier. Suitable cationic polymers include polymers of polyamine-epichlorohydrine resin. Suitable commercially available resins include KYMENE 718 and POLYCUP LX manufactured by Hercules Inc, now part of Ashland Inc.

In a fifth embodiment according to the present disclosure, the sketch paper may further comprise an intermediate layer of paper placed between the two base sheets, wherein this intermediate paper layer may be coated on one or both sides by resins, and wherein at least one resin is selected from the group of polyolefins, polyethylene, polypropylene, styrene acrylic resins, polyester resins or other polymers as well as waxes and silicones. Such embodiments may be particularly useful for applications in which the user wishes to apply amounts of ink which would saturate, or almost saturate, the sketch paper with fluid water- or oil- or solvent-based inks.

EXEMPLARY EMBODIMENTS

The following tables show exemplary implementations of the five embodiments previously described. In each case, at least one of the base sheets is applied with an aqueous emulsion using any suitable system used in the art for impregnating or covering base papers such as, but not limited to, air blade or color-dispensing bound rod, calibrated spray jets, rotogravure roller, or scraper.

Table I depicts exemplary implementations of the first three embodiments described above. In each of these three exemplary implementations, the aqueous emulsion was applied, and its thickness calibrated, using a color dispensing bound rod to give a dry thickness of between 3 and 8 grams per square meter (gsm) and, more specifically, of 4 to 5 $g/m^2$.

TABLE I

Embodiments 1-3

| | % Weight Example No. | | |
|---|---|---|---|
| | 1 | 2 | 3 |
| Kaolin with laminar structure | 5 | | |
| Calcined kaolin | 5 | 10 | 5 |
| Calcium carbonate | | | |
| Rutile titanium dioxide | | | |
| Anatase titanium dioxide | | | 5 |
| Ultra reopaque synthetic polymer | | | |
| Acetylated starch | | | |
| Polyvinyl alcohol with hydrolysis of 99% | | | |
| TRITON x-100 | | | |
| SURFYNOL ct 171 | 0.5 | 0.5 | 0.5 |
| Insolubilizer | 0.5 | 0.5 | 0.5 |
| Antifoamer | | | |
| Acrylic emulsions | 58 | 58 | 58 |
| Styrene acrylic polymers | 30 | 30 | 30 |
| Carbon black | 1 | 1 | 1 |
| TOTAL | 100 | 100 | 100 |

In another embodiment, the composition by percent weight of the emulsion may be 5% calcined kaolin, 5% anatase titanium dioxide, 0.5% non-ionic surfactant such as SURFYNOL ct 171, 0.5% insolubilizer, 59% acrylic emulsions, 29% styrene acrylic polymers, and 1% carbon black. In these exemplary embodiments, the opacity of the sketch paper is achieved by using an aqueous emulsion with one or more white pigments having a high refraction index. White pigments such as kaolins, calcined kaolins, calcium carbonate, synthetic polymers and titanium dioxide, due to their optic properties, are substances with a higher level of refraction (2.4, as a diamond). Even when pulverized or mixed with other loads, the average size of a 0.5 micron particle pigment provides a greater covering power and for this same reason is very opaque. The calcined kaolins are also an alternative to provide opacity due to the laminar form of the particles and because of the small particle size of only 1 to 2 microns also contributes to ink absorption.

Table II shows exemplary implementations of the fourth embodiment according to the present disclosure, wherein the two base sheets may be impregnated, prior to lamination, with a solution of insolubilizing agents that absorb to the paper fibers, together with carboxylated polyvinyl alcohols to provide a protective barrier.

TABLE II

Embodiment 4

| | % Weight Example No. | | |
|---|---|---|---|
| | 1 | 2 | 3 |
| Carboxylated polyvinyl alcohol, Hydrolysis of 99% | 50 | 40 | 40 |
| TRITON x-100 | 0.5 | 0.5 | 0 |
| | | | 0.5 |
| Insolubilizing resins | 45 | 55 | 0.5 |
| Antifoamer | | | |
| Acrylic styrene | 4.5 | | 59 |
| Styrene-butadiene polymers | | 4.5 | |
| TOTAL | 100 | 100 | 100 |

In these exemplary implementations, base sheets having a porosity of between 20 and 10 sec/100 ml Gurley Hill may be used with previous priming in the paper machine. This may provide sufficient absorption to be receptive to the inks or emulsions. In such embodiments, an aqueous emulsion containing white loads and an adhesive, as described with respect to the embodiments shown in Table I, may be applied to the first base sheet by means of a rotogravure system. An emulsion promoting adhesion may be applied to the second base sheet. The two base sheets may be laminated together by means of a mechanism operated by steel cylinders.

Table III shows exemplary implementations of the fifth embodiment according to the present disclosure, wherein the sketch paper further comprises an intermediate layer of paper placed between the two base sheets, and wherein this intermediate paper layer is coated on one or both sides by resins.

TABLE III

Embodiment 5

| | % Weight Example No. | | |
|---|---|---|---|
| | 1 | 2 | 3 |
| Insolubilizing resins | 5 | | 5.0 |
| Polyester resins | 50 | | |
| Styrene-acrylonitrile polymers | | 50 | 15.0 |
| Styrene-acrylic copolymers | | | |
| Styrene-butadiene copolymers | | 20 | 50 |
| Antifoamer | 0.5 | 0.5 | 0.5 |
| Calcined kaolin | 44.5 | 15 | 15 |
| Synthetic pigment | | 14.5 | 14.5 |
| TOTAL | 100 | 100 | 100 |

Various measurements were made with respect to each exemplary implementation described above. A Thwing Albert, Progage model, series No. 45523 micrometer recording readings in mm, microns, thousandths of an inch and points was utilized for measuring the variables to be controlled. An X-rite series No. 530 spectrodensitometer was used to measure surface density, and opacity and whiteness on the outside faces of the base papers. Additionally, an Ohaus Scout pro sp202 scale and a Thelco model 18 oven were used to measure the weight and moisture content of the sketch paper in each of the examples described above. The results are given below:

TABLE IV

Comparison of Embodiments 1-3

| Example No. | Embodiment 1 | | | Embodiment 2 | | | Embodiment 3 | | |
|---|---|---|---|---|---|---|---|---|---|
| | 1 | 2 | 3 | 1 | 2 | 3 | 1 | 2 | 3 |
| Basic weight g/m² | | 68 | | | 90 | | | 85 | |
| Weight g/m² TAPPI T-410 | 142 | 140 | 142 | 186 | 185 | 186 | 176 | 174 | 176 |
| Caliper Thousandths of an Inch TAPPI T-411 | 7.0 | 6.8 | 6.9 | 8.0 | 8.1 | 8.2 | 7.3 | 7.4 | 7.3 |
| Moisture Content % TAPPI-412 | 4.5 | 4.5 | 4.3 | 4.5 | 4.5 | 4.3 | 4.6 | 4.4 | 4.5 |
| Opacity % TAPPI T-425 Density | 92 | 90 | 91 | 96 | 97 | 98 | 94 | 95 | 94 |
| Whiteness T-452 | 89 | 90 | 90 | 90 | 88 | 89 | 90 | 90 | 89 |

TABLE V

Comparison of Embodiment 4

| | Embodiment 4 Example No. | | |
|---|---|---|---|
| | 1 | 2 | 3 |
| Basic weight g/m² | | 85 | |
| Weight g/m² TAPPI T-410 | 176 | 174 | 176 |
| Caliper Thousandths of an Inch TAPPI T-411 | 7.2 | 7.3 | 7.4 |
| Moisture Content % TAPPI-412 | 4.3 | 4.0 | 4.4 |
| Opacity % TAPPI T-425 Density | 98 | 98 | 99 |
| Whiteness T-452 | 89 | 90 | 89 |

TABLE VI

Comparison of Embodiment 5

| | Embodiment 4 Example No. | | |
|---|---|---|---|
| | 1 | 2 | 3 |
| Basic weight g/m² | | 72 | |
| Weight g/m² TAPPI T-410 | 230 | 230 | 230 |
| Caliper Thousandths of an Inch TAPPI T-411 | 10.5 | 10.5 | 10.5 |
| Moisture Content % TAPPI-412 | 4.3 | 4.2 | 4.0 |
| Opacity % TAPPI T-425 Density | 99 | 99.5 | 99 |
| Whiteness T-452 | 89 | 88 | 88 |

We claim:

1. A sketch paper for art and design applications comprising:
    (a) at least two base sheets of uncoated bond paper, wherein said two base sheets of bond paper are of the same type and same weight and wherein two of said base sheets of uncoated bond paper are the outermost layers of said sketch paper; and
    (b) at least one intermediate layer inserted between and coupled to said two base sheets,
    wherein said intermediate layer comprises an emulsion comprising
        at least one adhesive,
        at least one chemical opacifier compound having an average particle size of between 0.5 microns and 2 microns,
        at least one styrene copolymer emulsion, and
        at least one viscosity and surface tension control agent, and
    said sketch paper is substantially opaque.

2. The sketch paper of claim 1, wherein said at least one chemical opacifier compound is selected from the group consisting of carbon black, rutile titanium dioxide, anatase titanium dioxide, calcium carbonate, kaolin with laminar structure, calcined kaolin, white polymers, organic pigments, and inorganic pigments.

3. The sketch paper of claim 1, wherein said at least one styrene copolymer emulsion is selected from the group consisting of styrene-butadiene copolymers, styrene-acrylic emulsion copolymers, styrene-acetylated starch copolymers, styrene-oxidized starch copolymers, and styrene-low viscosity highly hydrolyzed polyvinyl alcohols copolymers.

4. The sketch paper of claim 1, wherein said at least one viscosity and surface tension control agent is an acrylic polymer.

5. The sketch paper of claim 1, wherein said at least one viscosity and surface tension control agent is a non-ionic surfactant.

6. The sketch paper of claim 5, wherein said non-ionic surfactant is polyethylene glycol tert-octylphenyl ether.

7. The sketch paper of claim 1, wherein each base sheet is impregnated on one side with a mixture comprising 50% carboxylated polyvinyl alcohol with 99% hydrolysis, 0.5% polyethylene glycol tert-octylphenyl ether, 45% insolubilizing resin, and 4.5% acrylic styrene prior to lamination, wherein said one side is the surface facing the other base sheet of bond paper.

8. The sketch paper of claim 7, wherein said insolubilizing resin comprises cationic polymers of polyamine-epichlorohydrin.

9. The sketch paper of claim 1, further comprising at least one synthetic resin, natural resin, or a combination thereof on at least one of the inside of each base sheet.

10. The sketch paper of claim 9, wherein said at least one synthetic resin, natural resin, or a combination thereof is selected from the group consisting of polyolefins, polyethylene, polypropylene, styrene acrylic resins, polyester resins, and additives selected from waxes and silicones.

11. The sketch paper of claim 1, further comprising at least one additional intermediate layer inserted between said two base sheets, wherein at least one such additional intermediate layer comprises one or more additional emulsions.

12. The sketch paper of claim 1, wherein at least one of said two base sheets is impregnated with one or more cationic wet strength additives.

13. The sketch paper of claim 12, wherein at least one of said base sheets is further impregnated with one or more carboxylated polyvinyl alcohols.

14. The sketch paper of claim 1, wherein the opacity of said sketch paper is between 88% and 99.5% TAPPI T-425.

15. The sketch paper of claim 1, wherein the TAPPI T-452 brightness of said sketch paper is between 88 to 90%.

16. The sketch paper of claim 1, wherein said at least two base sheets have a Gurley Hill porosity of between 20 and 10 sec/100 ml.

17. The sketch paper of claim 1, wherein said at least two base sheets have a weight of between 68 and 100 g/m$^2$.

18. The sketch paper of claim 1, wherein said emulsion comprises kaolin with laminar structure, calcined kaolin, anatase titanium dioxide, rutile titanium dioxide, non-ionic surfactant, insolubilizer, acrylic emulsions, styrene acrylic polymers, and carbon black.

19. The sketch paper of claim 1, wherein the composition by percent weight of said emulsion is 10% calcined kaolin, 0.5% non-ionic surfactant, 0.5% insolubilizer, 58% acrylic emulsions, 30% styrene acrylic polymers, and 1% carbon black.

20. The sketch paper of claim 1, wherein the composition by percent weight of said emulsion is 5% calcined kaolin, 5% anatase titanium dioxide, 0.5% non-ionic surfactant, 0.5% insolubilizer, 59% acrylic emulsions, 29% styrene acrylic polymers, and 1% carbon black.

21. The sketch paper of claim 1, wherein the composition by percent weight of said emulsion is 5% calcined kaolin, 5% anatase titanium dioxide, 0.5% non-ionic surfactant, 0.5% insolubilizer, 58% acrylic emulsions, 30% styrene acrylic polymers, and 1% carbon black.

22. The sketch paper of claim 1, further comprising at least one additional intermediate layer of paper placed between said two base sheets, wherein said additional intermediate paper layer may be coated on one or both sides by resins, and wherein at least one resin is selected from the group consisting of polyolefins, polyethylene, polypropylene, styrene acrylic resins, polyester resins, and additives selected from waxes; and silicones.

23. The sketch paper of claim 1, wherein said emulsion has a dry thickness of between 3 to 8 grams per square meter (g/m$^2$).

24. The sketch paper of claim 23, wherein said emulsion has a dry thickness of between 4 to 5 g/m$^2$.

* * * * *